Jan. 13. 1925.

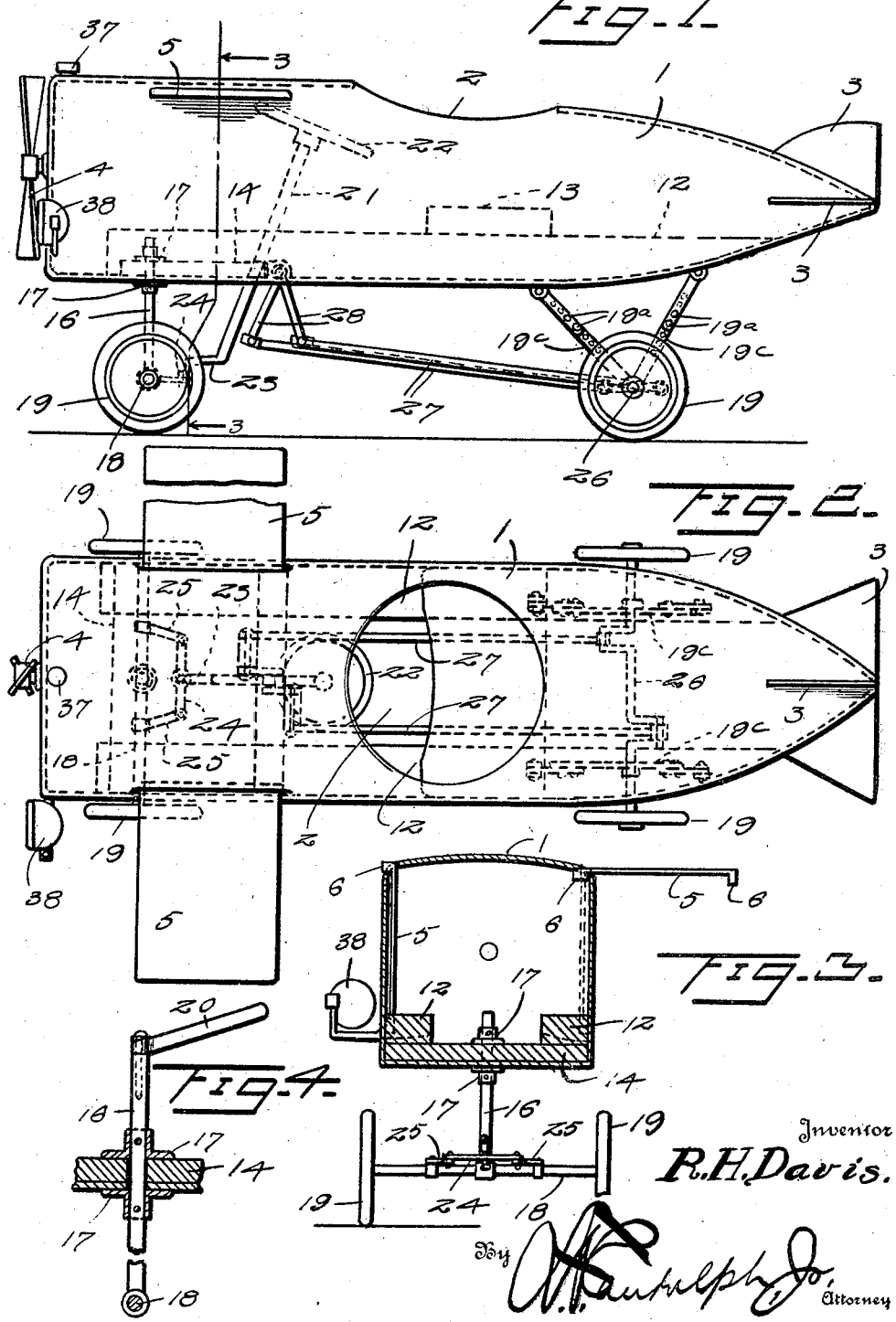

R. H. DAVIS

CHILD'S VEHICLE

Filed Dec. 4, 1923

Inventor
R. H. Davis.

By
Attorney

Patented Jan. 13, 1925.

1,523,178

UNITED STATES PATENT OFFICE.

RULON H. DAVIS, OF SALT LAKE CITY, UTAH.

CHILD'S VEHICLE.

Application filed December 4, 1923. Serial No. 678,460.

*To all whom it may concern:*

Be it known that I, RULON H. DAVIS, a citizen of the United States, residing at Salt Lake City, in the county of Salt Lake and State of Utah, have invented certain new and useful Improvements in Children's Vehicles; and I do hereby declare the following to be a full, clear, and exact description of the invention, such as will enable others skilled in the art to which it appertains to make and use the same.

The present invention has for its object the provision of a vehicle for children which in general outline represents an automobile and a flying machine, the planes of the latter being foldable or removable so as to be out of the way when not required to be exposed.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view of a child's vehicle embodying the invention,

Figure 2 is a top plan view thereof.

Figure 3 is a sectional view on the line 3—3 of Figure 1, looking to the front as indicated by the arrows, Figure 4 is a detail view showing more clearly the manner of mounting the steering post.

Figure 5:
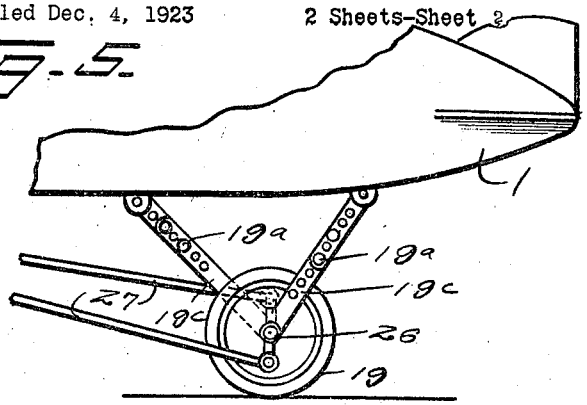

Figure 5 is a detail view showing more clearly the manner of mounting the rear axle, whereby the rear portion of the vehicle may be adjusted vertically.

Figure 6:
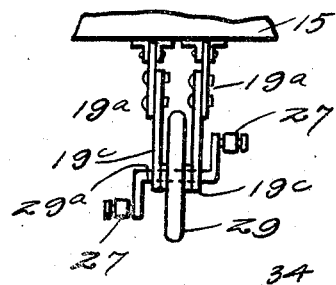
Figure 7:
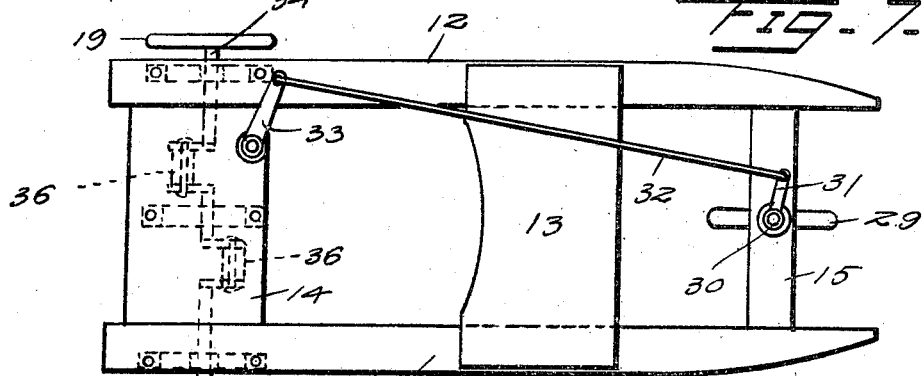
Figures 8, 9:
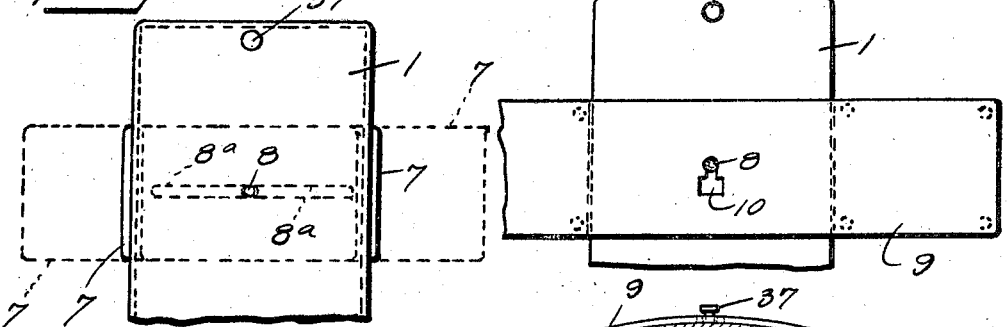

Figure 6 is a detail view of a modified form of propelling means,

Figure 7 is a top plan view of a further modification,

Figure 8 is a detail view showing laterally slidable planes,

Figure 9 is a detail view showing a detachable plane, and

Figure 10:
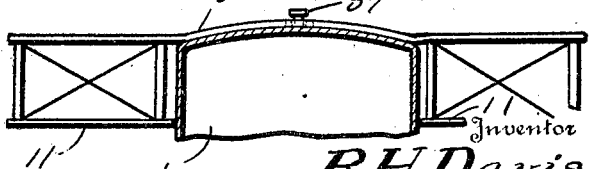

Figure 10 is a detail view showing a biplane structure.

Corresponding and like parts are referred to in the following description and designated in the several views of the drawings by like reference characters.

The vehicle comprises a running gear and a body, the latter being preferably of sheet metal and of torpedo outline. The body 1 approximates the fuselage of a flying machine and has a cockpit 2, tail planes 3 representative of steering rudders, a front propeller 4 and lateral planes. The planes 5 are adapted to slide through openings formed in the sides of the body 1 and when folded drop within the body, as indicated by the full and dotted lines in Figure 3. Stops 6 at opposite ends of the planes 5 limit their sliding movement in each direction. When the planes 5 are slid inwardly, they drop against the inner side of the body 1 so as to be out of the way. The planes 7 are adapted to overlap when slid inwardly and are secured in the required adjusted position by means of a bolt 8 which extends through slots formed in each of the planes. The plane 9 is of a length to extend across the body and beyond opposite sides thereof the required distance and is held in position by means of a bolt 8 coacting with a T-shaped opening 10 formed in the central portion of the plane. If preferred other planes 11 may be disposed below the planes 9, whereby to present the appearance of a biplane.

The running gear comprises side bars 12, a seat 13 and crosspieces 14 and 15. A steering post 16 is mounted in the crosspiece 14 and has flanged collars or plates 17 secured thereto, the one above and the other below the crosspiece 14. The front axle 18 is secured to the lower end of the steering post 16 and is provided with supporting wheels 19. A bar 20 is secured to the upper end of the steering post 16 and provides convenient means for steering the device.

In another form of the steering mechanism, a post 21 is pivotally mounted in the crosspiece 14 and is provided at its upper end with a steering wheel 22 and at its lower end with a crank 23 which is pivoted to a crossbar 24 which in turn is pivoted at its ends to arms 25 projecting laterally from the axle 18. The rear axle 26 has oppositely disposed crank portions which are connected by means of rods 27 with pedals 28 conveniently positioned to be operated by the feet of the child occupying the vehicle.

In the modifications shown in Figures 6 and 7, different means are shown for propelling the vehicle. As shown in Figure 6, a single wheel 29 is fast to an axle having oppositely disposed cranks at its ends which are adapted to be connected by means of rods 27 with crank portions of the main axle. In the construction shown in Figure 7, the steering post 30 is located in rear and is provided at its upper end with an arm 31 which is connected by means of a rod 32 with an arm 33 disposed at the front of the vehicle. This construction also shows a front axle 34 provided at its ends with wheels 35 and having crank portions 36 provided with pedals to receive the feet of the child whereby the driving power may be applied directly to the drive axle.

The support for the rear axle 26 comprises pivoted arms 19$^a$ and a V-shaped hanger 19$^c$. These parts overlap and are formed in their length with openings which are adapted to receive a bolt or other fastening. Similar supporting means are provided for the crank axle 29$^a$ in Figure 6.

It will be understood from the foregoing taken in connection with the accompanying drawings, that the vehicle adds to the interest of the child since it approximates the outline of a vehicle and a flying machine, and to add to the appearance a cap 37 and a headlight 38 are applied to the front of the body to give to the same the appearance of an automobile. The vehicle may be steered as well as propelled in a variety of ways, as indicated herein.

What is claimed is:

1. A vehicle of the character specified comprising a running gear and a body, the rear portion of the body being adjustable vertically by means of adjustable connections between the rear axle and the main frame, said adjustable connections comprising arms pivotally mounted to the body, and a V-shaped hanger, said arms and hanger having series of openings therein to receive fastening members.

2. In a vehicle of the character specified, a running gear, a body mounted thereon, and planes mounted upon the body and adapted to be projected laterally therefrom or to be withdrawn within the body so as to be out of the way.

3. A vehicle of the character specified comprising a running gear, a hollow body mounted thereon, and planes mounted in openings in the sides of the body and adapted to be projected outwardly therefrom or to be withdrawn and dropped vertically against the inner sides of the body, said planes having stops at opposite ends to limit the movement thereof in both directions.

In testimony whereof I affix my signature in presence of two witnesses.

RULON H. DAVIS.

Witnesses:
 EDWIN BUTTERWORTH,
 S. A. ABBOTT.